US011865947B2

(12) United States Patent
Ortmann et al.

(10) Patent No.: US 11,865,947 B2
(45) Date of Patent: Jan. 9, 2024

(54) REGENERATIVE BRAKING CONTROL SYSTEM FOR A HYBRID OR ELECTRIC VEHICLE

(71) Applicant: FORD GLOBAL TECHNOLOGIES, LLC, Dearborn, MI (US)

(72) Inventors: Walter Joseph Ortmann, Saline, MI (US); Ashish Naidu, Canton, MI (US); Colby Jason Buckman, Brownstown, MI (US); Mark Anthony Tascillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 17/143,546

(22) Filed: Jan. 7, 2021

(65) Prior Publication Data

US 2022/0212542 A1 Jul. 7, 2022

(51) Int. Cl.
*B60L 7/18* (2006.01)
*B60T 8/171* (2006.01)
*B60T 8/17* (2006.01)
*B60T 8/174* (2006.01)
*B60T 7/12* (2006.01)
*B60T 7/22* (2006.01)
*B60T 8/32* (2006.01)

(52) U.S. Cl.
CPC .............. *B60L 7/18* (2013.01); *B60T 7/12* (2013.01); *B60T 7/22* (2013.01); *B60T 8/17* (2013.01); *B60T 8/171* (2013.01); *B60T 8/174* (2013.01); *B60T 8/321* (2013.01); *B60L 2250/26* (2013.01); *B60T 2201/022* (2013.01); *B60T 2210/00* (2013.01); *B60T 2210/12* (2013.01); *B60T 2210/20* (2013.01); *B60T 2210/24* (2013.01); *B60T 2220/04* (2013.01); *B60T 2250/04* (2013.01); *B60T 2270/60* (2013.01)

(58) Field of Classification Search
CPC .......... B60L 7/18; B60L 2250/26; B60T 7/12; B60T 7/22; B60T 8/17; B60T 8/171; B60T 8/321; B60T 2210/12; B60T 2210/20; B60T 2210/24; B60T 2220/04; B60T 2250/04; B60T 2270/60; B60T 2220/02; B60T 2270/604; B60W 30/18127; B60W 2540/10; B60W 2540/12; B60W 10/08; B60W 10/30; B60W 20/00; B60W 40/00; B60W 40/105; Y02T 10/64
See application file for complete search history.

(56) References Cited

U.S. PATENT DOCUMENTS 9,545,849 B2     1/2017  Perkins et al.
9,616,757 B2 *   4/2017  Lee ..................... B60L 15/2045
(Continued)

*Primary Examiner* — Gertrude Arthur Jeanglaude
(74) *Attorney, Agent, or Firm* — David B Kelley; Brooks Kushman P.C

(57) ABSTRACT

A vehicle includes an electric machine and a controller. The controller is programmed to, in response to releasing an accelerator pedal during a first driving scenario that is based on a first set of navigation data, increase regenerative braking torque of the electric machine to a first value. The controller is further programmed to, in response to releasing the accelerator pedal during a second driving scenario that is based on a second set of navigation data, increase the regenerative braking torque of the electric machine to a second value that is less than the first value.

17 Claims, 2 Drawing Sheets

(56) References Cited

U.S. PATENT DOCUMENTS

| | | | |
|---|---|---|---|
| 9,630,508 B2* | 4/2017 | Gabor | B60L 7/12 |
| 2015/0019058 A1 | 1/2015 | Georgiev | |
| 2016/0059703 A1* | 3/2016 | Miller | B60W 30/18127 |
| | | | 701/22 |
| 2018/0135744 A1 | 5/2018 | Kuang et al. | |
| 2018/0297475 A1* | 10/2018 | Zhao | B60T 8/172 |
| 2019/0168767 A1 | 6/2019 | Gaither et al. | |
| 2021/0237581 A1* | 8/2021 | Rajaie | B60L 7/18 |

* cited by examiner

REGENERATIVE BRAKING CONTROL SYSTEM FOR A HYBRID OR ELECTRIC VEHICLE

TECHNICAL FIELD

The present disclosure relates to hybrid or electric vehicles and control systems for hybrid vehicles or electric.

BACKGROUND

Hybrid or electric vehicles may include electric machines that are configured to propel the vehicle and to recharge a battery via regenerative braking.

SUMMARY

A vehicle includes an accelerator pedal, an electric machine, at least one sensor, a receiver, an electronic horizon module, and a controller. The electric machine is configured to propel the vehicle and to brake the vehicle via regenerative braking based on a position of the accelerator pedal. The at least one sensor is configured to detect conditions external to the vehicle. The receiver is configured to received data from external sources. The electronic horizon module has route attribute data. The controller is programmed to, in response to releasing the accelerator pedal during a first driving scenario that corresponds to a first set of data, that includes the route attribute data, the data received from external sources, or the data from the at least one sensor that is indicative of the conditions external to the vehicle, increase a regenerative braking torque to a first value. The controller is further programmed to, in response to releasing the accelerator pedal during a second driving scenario that corresponds to a second set of data, that includes the route attribute data, the data received from external sources, or the data from the at least one sensor that is indicative of the conditions external to the vehicle, increase a regenerative braking torque to a second value that is less than the first value.

A vehicle includes an electric machine and a controller. The controller is programmed to, in response to releasing an accelerator pedal during a first driving scenario that is based on a first set of navigation data, wherein the first set of navigation data includes a first current vehicle speed and a first speed limit, increase regenerative braking torque of the electric machine to a first value. The controller is further programmed to, in response to releasing the accelerator pedal during a second driving scenario that is based on a second set of navigation data, wherein the second set of navigation data includes a second current vehicle speed equal to the first current vehicle speed and a second speed limit that is greater than the first speed limit, increase the regenerative braking torque of the electric machine to a second value that is less than the first value.

A vehicle includes an accelerator pedal, an electric machine, and a controller. The controller is programmed to, increase a regenerative braking torque of the electric machine to a first value based on releasing the accelerator pedal during a first driving scenario that corresponds to a first set of data that includes route attribute data and data that is indicative of the conditions external to the vehicle. The controller is further programmed to, increase a regenerative braking torque of the electric machine to a second value that is less than the first value based on releasing the accelerator pedal during a second driving scenario that corresponds to a second set of data that includes the route attribute data and the data that is indicative of the conditions external to the vehicle. The data that is indicative of the conditions external to the vehicle includes a proximity of other vehicles, weather conditions, or traffic conditions. The route attribute data includes a road grade of the predetermined route, a speed limit of the predetermined route, a road curvature of the predetermined route, or expected stops along the predetermined route.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
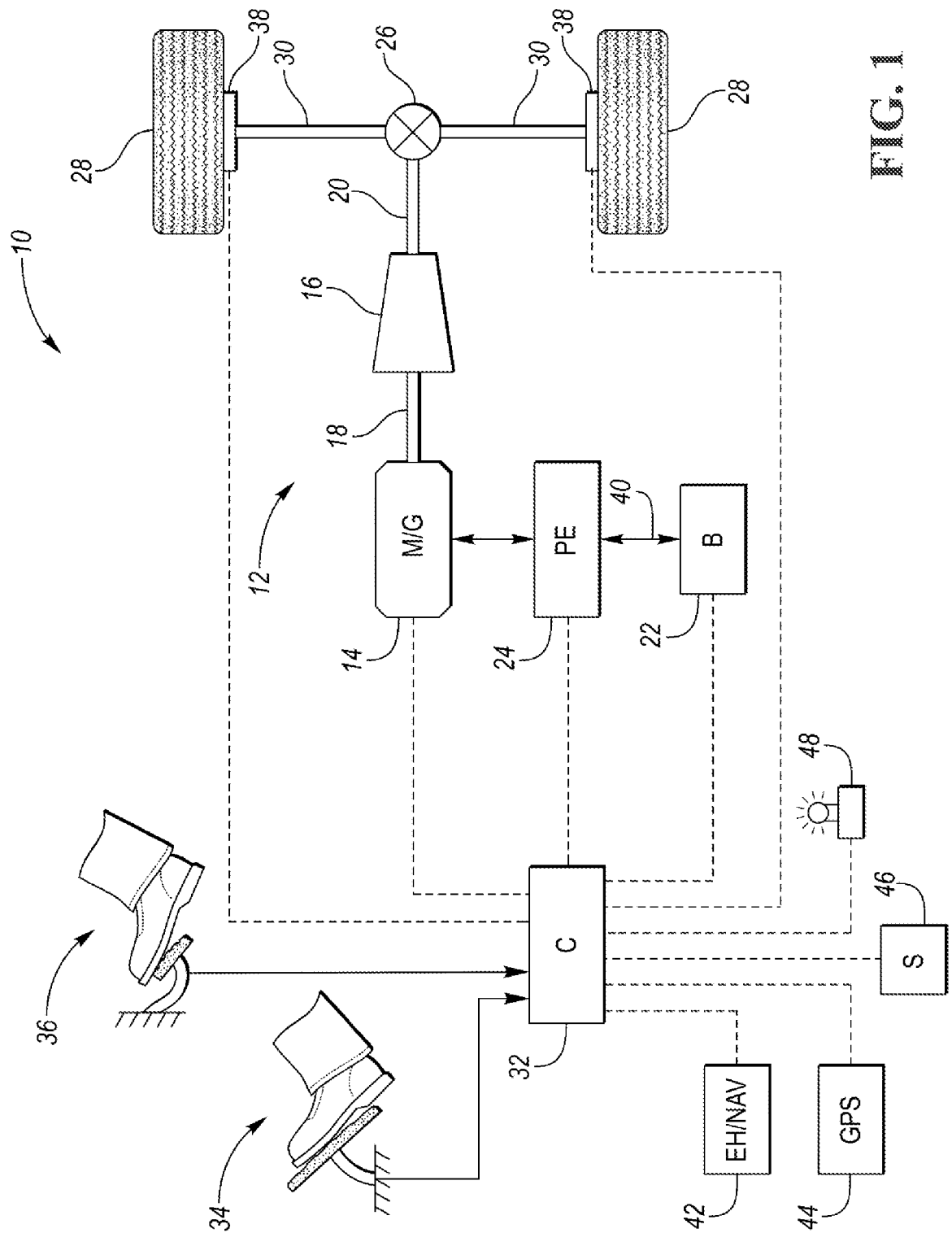
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VS S), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16. Releasing the accelerator pedal 34 and/or applying the brake pedal 36 may also generate a regenerative braking command to utilized the M/G 14 to recharge the battery 22.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The vehicle 10 may include an electronic horizon and/or navigation module 42. The electronic horizon and/or navigation module 42 may be a part of controller 32 or may be a separate controller that communicates with controller 32. The electronic horizon and/or navigation module 42 may include onboard navigation data or information such as map data and route attribute data. The position of the vehicle relative to the map data within electronic horizon and/or navigation module 42 may be determined via a global positing system (GPS) 44. The GPS 44 may be a part of controller 32 or may be a separate module that communicates with controller 32. AV2HP/Electronic Horizon software (i.e., the software of the electronic horizon and/or navigation module 42) communicates static route attributes to the controller 32, in the direction the vehicle 10 is traveling based on a predetermined or calibratable horizon length (i.e., a predetermined distance in front of the vehicle 10 on the current route the vehicle is traveling on). The electronic horizon and/or navigation module 42 and the GPS 44 may each include a microprocessor, memory storage, and/or any other attribute described with respect to controller 32 herein.

The navigation data within the electronic horizon and/or navigation module 42 that includes the route attribute data may include data or information regarding the region in which the vehicle is operating, such as road grade, speed limit, road curvature, expected stops/posted signs (e.g., stop signs, yield signs, speed limits, roundabouts, red lights, traffic congestion, etc.), number of lanes, type of road (e.g., city road or highway) etc. The data or information regarding the region in which the vehicle is operating is static data or information (i.e., information that does change with time).

Additionally, the navigation data may include dynamic data or information such as traffic data or information (e.g., traffic volume or traffic density) and weather data or information (e.g., temperature, humidity, rain, snow, or any factor that may affect traffic speed, road pavement conditions, etc.).

Such static data or information and/or dynamic data or information may be stored in the controller 32, the electronic horizon and/or navigation module 42, or GPS 44. Such static data or information and/or dynamic data or information may be received via vehicle-to-vehicle (V2V) communication (i.e., data transmitted and received from other vehicles), vehicle-to-infrastructure (V2I) communication (i.e., data transmitted and received from the roadway infrastructure), vehicle-to-everything (V2X) communication (i.e., data transmitted and received from any source), virtual-to-physical (V2P) data, (i.e., data that is based on a virtual model), radio transmissions (e.g., AM, FM, or Satellite digital audio radio service), vehicle sensors 46 (e.g., radar, lidar, sonar, cameras, etc.), a traffic information server, etc. The vehicle 10 sensors 46 may be configured to communicate with the controller 32 and maybe utilized to detect conditions external to and/or proximate the vehicle 10 such as traffic conditions (e.g., traffic volume or density), proximity of other vehicles, weather conditions (e.g., rain or snow), etc. The vehicle may include a receiver 48 that is configured to communicate wirelessly received data (e.g., V2V data, V2I data, V2X data, etc.) to the controller 32. The wirelessly received data may also include conditions external to and/or proximate the vehicle 10.

A drive horizon program, which may be stored within controller 32 or may be separate controller that communicates with controller 32, may superimpose the dynamic data or information (e.g., traffic or weather data) over the static data or information (e.g., map data and route attribute data) to predict vehicle events such as, acceleration, deceleration, coasting, etc., in the horizon (i.e., the predetermined distance in front of the vehicle 10 on the current route the vehicle is traveling on) along the route. Such predictions of vehicle events such as, acceleration, deceleration, coasting, etc., allows further predictions of vehicle speed, load from the road grade, thermal loads on the vehicle 10 (or vehicle subcomponents), friction coefficient of the road surface (which may be affected by weather or conditions such as flooding or road spills), and other attributes (e.g., presence of stop signs, traffic lights, change in speed limits, climate demand, Road curvature, speed and acceleration of other vehicles, construction, etc.) that could be used to predict the expected power and energy needed from the powertrain to propel the vehicle. By knowing the predicted power and torque needed to propel the vehicle 10, the decision to start the engine may be changed dynamically to optimize fuel consumption and improve drivability.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

It should also be understood that the vehicle configuration described herein is merely exemplary and is not intended to be limited. Other hybrid or electric vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell vehicles, battery operated electric vehicles (BEVs), or any other vehicle configuration known to a person of ordinary skill in the art.

Figure 2:
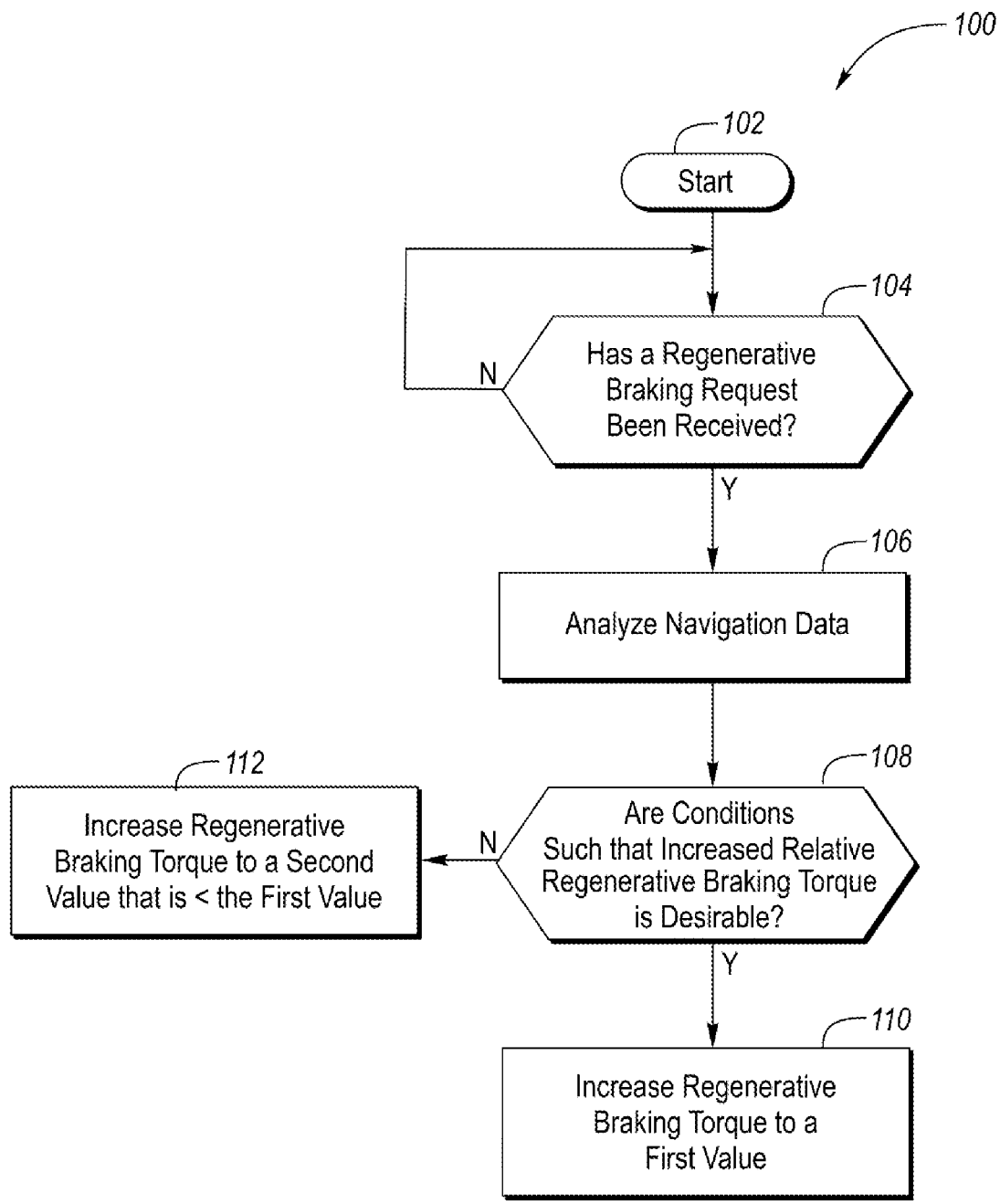
FIG. 2 is a flowchart illustrating a method for controlling regenerative braking in a hybrid or electric vehicle.

Referring to FIG. 2, a flowchart of a method 100 for controlling regenerative braking is illustrated. The method 100 may be stored as control logic and/or an algorithm within the controller 32. The controller 32 may implement the method 100 by controlling the various components of the vehicle 10. The method 100 is initiated at start block 102. The method 100 may be initiated at start block 102 by turning a start key or ignition of the vehicle 10 to an "on" position.

The method 100 then moves on to block 104 where it is determined if a regenerative braking request has been received. The regenerative braking request may be generated in response to releasing the accelerator pedal 34 or by depressing the brake pedal 36, and in response to a request to charge the battery 22. The request to charge the battery 22 may result from a charge of the battery 22 being less than a threshold. If the regenerative braking request has not been received, the method 100 recycles back to the beginning of block 104.

If the regenerative braking request has been received, the method 100 moves on to block 106. At block 106, the method 106 analyzes the navigation data. The navigation data may include any of the data described herein, including the wirelessly received data (e.g., V2V data, V2I data, V2X data, radio data, etc.), the data revived via the sensors 46 (e.g., conditions external to and/or proximate the vehicle 10 such as traffic volume, weather conditions, etc.), the route attribute data (or any other data) from the electronic horizon and/or navigation module 42, data from the GPS (e.g., vehicle location).

Once the navigation data has been analyzed, the method 100 moves on to block 108, where it is determined if the conditions are such based on the navigation data that an increased relative regenerative braking torque is optimal or desirable. More specifically, at block 108, the method 100 is configured to distinguish between various driving scenarios based on the navigation data to determine if a relatively increased or relatively decreased regenerative torque is optimal or desirable.

Several driving scenarios that may result in a relatively increased or relatively decreased regenerative torque may include:

(1) A regenerative braking torque generated in response to a first driving scenario that corresponds to a first set of the navigation data which includes an expected vehicle stop that is within a first distance may be larger than a regenerative braking torque generated in response to a second driving scenario that corresponds to a second set of the navigation data which includes an expected vehicle stop that is within a second distance where the first distance is shorter than the second distance. The deceleration rate can be a function (e.g., a linear or exponential function) of vehicle speed as the vehicle comes to a stop. The driver preference for deceleration can be learned by observation of the use of brake and acceleration pedals.

(2) A regenerative braking torque generated in response to a first driving scenario that corresponds to a first set of the navigation data which includes a first speed limit may be larger than a regenerative braking torque generated in response to a second driving scenario that corresponds to a second set of the navigation data which includes a second speed limit where the first speed limit is less than the second speed limit, regardless if the vehicle is traveling at the same speed under either the first driving scenario or the second driving scenario. While coming into a lower speed zone (e.g., when traveling into a zone having a lower speed limit relative to a zone that the vehicle is exiting) the regenerative braking torque may be increased until a desired speed is achieved and then may return (i.e., may be decreased) to the previous levels. This feature helps the driver meet the speed limit without needing to provide braking input.

(3) A regenerative braking torque generated in response to a first driving scenario that corresponds to a first set of the navigation data which includes a first road curve radius may be larger than a regenerative braking torque generated in response to a second driving scenario that corresponds to a second set of the navigation data which includes a second road curve radius where the first road curve radius is shorter than the second road curve radius. The amount of regenerative braking may be a function (e.g., a linear or exponential function) of the road curve radius that decreases as the road curve radius decreases, so that the vehicle will slow faster when coming to a tighter curve.

(4) A regenerative braking torque generated in response to a first driving scenario that corresponds to a first set of the navigation data which includes a city driving condition of the vehicle may be larger than a regenerative braking torque generated in response to a second driving scenario that corresponds to a second set of the navigation data which includes a highway or freeway driving condition of the vehicle. While on a highway, the driver may not want an increased deceleration and may prefer a 'sailing' type of behavior. Also, it has been shown that a lower level of coasting can improve fuel economy (range). An individual driver's coasting behavior can be learned over time.

(5) A regenerative braking torque generated in response to a first driving scenario that corresponds to a first set of the navigation data which includes detecting an object within a first distance of the vehicle may be larger than a regenerative braking torque generated in response to a second driving scenario that corresponds to a second set of the navigation data which includes detecting an object within a second distance of the vehicle where the first distance is shorter than the second distance. Objects may include pedestrians or other vehicles, such as an approaching vehicle that is traveling at a slower speed than vehicle 10. Objects may be detected by the sensors 46. If the regenerative braking torque was reduced due to an approaching vehicle, once the vehicle speed is matched or the desired following distance is achieved relative to the approaching vehicle, the regenerative braking torque may be increase back to normal levels. The following distance may also be learned based on driver behavior in different conditions such as city, highway, near POI (point of interest), or on a low mu surface. The following distance may also be a function of vehicle speed.

(6) A regenerative braking torque generated in response to a first driving scenario that corresponds to a first set of the navigation data which includes detecting an object within a path of the vehicle may be larger than a regenerative braking torque generated in response to a second driving scenario that corresponds to a second set of the navigation data which includes non-detection of an object within a path of the vehicle. The increased regenerative braking under such a first scenario may be desirable when there is an object in the path of the vehicle in order slow the vehicle in response to an anticipated braking event to avoid contact with an object.

(7) A regenerative braking torque generated in response to a first driving scenario that corresponds to a first set of the navigation data which includes the vehicle traveling at a speed that is greater than a speed limit may be larger than a regenerative braking torque generated in response to a second driving scenario that corresponds to a second set of the navigation data which includes the vehicle traveling at a speed that is less than a speed limit. This would aid the driver in staying within the speed limit. The amount of regenerative braking torque may be a function (e.g., a linear or exponential function) of the vehicle speed above the speed limit, may be based on desired level that is input by the user into the vehicle controls (e.g., a human machine interface), or a may be based on a machine learning algorithm that learns driver behavior over time (e.g., looking at brake pedal and accelerator pedal usage to learn that driver's desired behavior and adjust regenerative braking torque levels).

(8) A regenerative braking torque generated in response to a first driving scenario that corresponds to a first set of the navigation data which includes a down slope road grade or gradient may be larger than a regenerative braking torque generated in response to a second driving scenario that corresponds to a second set of the navigation data which includes an up slope road grade or gradient. Furthermore, the amount of regenerative braking may be a function (e.g., a linear or exponential function) of grade or gradient that increases as a down slope road grade or gradient increase or decreases as an up slope road grade or gradient increases. Adjusting the regenerative braking torque based on the slope provides a more consistent deceleration that is independent of the road grade.

(9) A regenerative braking torque generated in response to a first driving scenario that corresponds to a first set of the navigation data which includes a first road coefficient of friction may be larger than a regenerative braking torque generated in response to a second driving scenario that corresponds to a second set of the navigation data which includes a second road coefficient of friction where the first road coefficient of friction is greater than the second road coefficient of friction. For example, if a low coefficient of friction of the road surface is detected, (e.g., from snow or ice), reducing regenerative braking may provide a more controllable and stable vehicle. The amount of regenerative braking may be a function (e.g., a linear or exponential function) of coefficient of friction of the road surface that decreases as the coefficient of friction of the road surface decreases.

These individual events can be further improved by learning the driver behavior during these events and further modifying the deceleration rate and regenerative braking torque to match the individual driver's preference. Artificial intelligence or machine learning algorithm(s) can be developed to identify the unique behavior of the individual driver. Such algorithms may be stored in controller 32. The regenerative braking torque values for each may can be tailored to a specific individual and added to a user profile that is stored within controller 32. The driving scenarios described above are relatively independent of each other. However, the driving scenarios may be utilized together, independently, or in any combination when adjusting the value of the regenerative braking torque.

If it is determined at block 108 that that an increased relative regenerative braking torque is optimal or desirable, the method 100 moves on to block 110 where the regenerative braking torque is increase to a first value. If it is determined at block 108 that that an increased relative regenerative braking torque is not optimal or desirable, the method 100 moves on to block 112 where the regenerative braking torque is increase to a second value that is less than first value.

It should be understood that the flowchart in FIG. 2 is for illustrative purposes only and that the method 100 should not be construed as limited to the flowchart in FIG. 2. Some of the steps of the method 100 may be rearranged while others may be omitted entirely. It should be further understood that the designations of first, second, third, fourth, etc. for any other component, state, or condition described herein may be rearranged in the claims so that they are in chronological order with respect to the claims The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an accelerator pedal;
   an electric machine configured to propel the vehicle and to brake the vehicle via regenerative braking based on a position of the accelerator pedal;
   at least one sensor configured to detect conditions external to the vehicle;
   a receiver configured to received data from external sources;
   an electronic horizon controller having route attribute data stored therein; and
   a controller programmed to,
      in response to releasing the accelerator pedal during a first driving scenario that corresponds to a first set of data, that includes the route attribute data, the data received from external sources, or the data from the at least one sensor that is indicative of the conditions external to the vehicle, increase a regenerative braking torque to a first value, and
      in response to releasing the accelerator pedal during a second driving scenario that corresponds to a second set of data, that includes the route attribute data, the data received from external sources, or the data from the at least one sensor that is indicative of the conditions external to the vehicle, increase a regenerative braking torque to a second value that is less than the first value.

2. The vehicle of claim 1, wherein the first set of data includes a stop that is within a first distance and the second set of data includes a stop that is within a second distance, and wherein the first distance is shorter than the second distance.

3. The vehicle of claim 1, wherein the first set of data includes a first speed limit and the second set of data includes a second speed limit, and wherein the first speed limit is less than the second speed limit.

4. The vehicle of claim 1, wherein the first set of data includes a first road curve radius and the second set of data includes a second road curve radius, and wherein the first road curve radius is shorter than the second road curve radius.

5. The vehicle of claim 1, wherein the first set of data includes a city driving condition of the vehicle and the second set of data includes a highway driving condition of the vehicle.

6. The vehicle of claim 1, wherein the first set of data includes detecting an object within a first distance of the vehicle and the second set of data includes detecting an object within a second distance of the vehicle, and wherein the first distance is shorter than the second distance.

7. The vehicle of claim 1, wherein the first set of data includes the vehicle traveling at a speed that is greater than a speed limit and the second set of data includes the vehicle traveling at a speed that is less than a speed limit.

8. The vehicle of claim 1, wherein the first set of data includes a down slope road grade and the second set of data includes an up slope road grade.

9. The vehicle of claim 1, wherein the first set of data includes a first road coefficient of friction and the second set of data includes a second road coefficient of friction, and wherein the first road coefficient of friction is greater than the second road coefficient of friction.

10. The vehicle of claim 1, wherein the first set of data or the second set of data includes learned behavior from prior applications of the accelerator pedal or prior applications of a brake pedal.

11. A vehicle comprising:
    an electric machine; and
    a controller programmed to,
       in response to releasing an accelerator pedal during a first driving scenario that is based on a first set of navigation data, wherein the first set of navigation data includes a first current vehicle speed and a first speed limit, increase regenerative braking torque of the electric machine to a first value, and
       in response to releasing the accelerator pedal during a second driving scenario that is based on a second set of navigation data, wherein the second set of navigation data includes a second current vehicle speed equal to the first current vehicle speed and a second speed limit that is greater than the first speed limit, increase the regenerative braking torque of the electric machine to a second value that is less than the first value, wherein the navigation data includes (i) sensor data of the conditions external to the vehicle, (ii) route attribute data, or (iii) data received wirelessly from external sources.

12. The vehicle of claim 11, wherein the controller is further programmed to,
    in response to releasing an accelerator pedal during a third driving scenario that is based on a third set of navigation data, wherein the third set of navigation data includes a stop that is within a first distance, increase regenerative braking torque of the electric machine to a third value, and
    in response to releasing the accelerator pedal during a fourth driving scenario that is based on a fourth set of navigation data, wherein the fourth set of navigation data includes a stop that is within a second distance that is greater than the first distance, increase the regenerative braking torque of the electric machine to a fourth value that is less than the third value.

13. The vehicle of claim 11, wherein the controller is further programmed to,
    in response to releasing an accelerator pedal during a third driving scenario that is based on a third set of navigation data, wherein the third set of navigation data includes a first road curve radius, increase regenerative braking torque of the electric machine to a third value, and
    in response to releasing the accelerator pedal during a fourth driving scenario that is based on a fourth set of navigation data, wherein the fourth set of navigation data includes a second road curve radius that is greater than the first road curve radius, increase the regenerative braking torque of the electric machine to a fourth value that is less than the third value.

14. The vehicle of claim 11, wherein the controller is further programmed to,
    in response to releasing an accelerator pedal during a third driving scenario that is based on a third set of navigation data, wherein the third set of navigation data includes detecting an object within a first distance of the vehicle, increase regenerative braking torque of the electric machine to a third value, and
    in response to releasing the accelerator pedal during a fourth driving scenario that is based on a fourth set of navigation data, wherein the fourth set of navigation data includes an object within a second distance of the vehicle that is greater than the first distance, increase the regenerative braking torque of the electric machine to a fourth value that is less than the third value.

15. The vehicle of claim 11, wherein the controller is further programmed to, in response to releasing an accelerator pedal during a third driving scenario that is based on a third set of navigation data, wherein the third set of navigation data includes a third current vehicle speed being greater than a speed limit, increase regenerative braking torque of the electric machine to a third value, and in response to releasing the accelerator pedal during a fourth driving scenario that is based on a fourth set of navigation data, wherein the fourth set of navigation data includes the third current vehicle speed being less than the speed limit, increase the regenerative braking torque of the electric machine to a fourth value that is less than the third value.

16. The vehicle of claim 11, wherein the controller is further programmed to, in response to releasing an accelerator pedal during a third driving scenario that is based on a third set of navigation data, wherein the third set of navigation data includes a down slope road grade, increase regenerative braking torque of the electric machine to a third value, and in response to releasing the accelerator pedal during a fourth driving scenario that is based on a fourth set of navigation data, wherein the fourth set of navigation data includes an up slope road grade, increase the regenerative braking torque of the electric machine to a fourth value that is less than the third value.

17. A vehicle comprising:
an accelerator pedal;
an electric machine; and
a controller programmed to,
increase a regenerative braking torque of the electric machine to a first value based on releasing the accelerator pedal during a first driving scenario that corresponds to a first set of data that includes route attribute data and data that is indicative of the conditions external to the vehicle,
increase a regenerative braking torque of the electric machine to a second value that is less than the first value based on releasing the accelerator pedal during a second driving scenario that corresponds to a second set of data that includes the route attribute data and the data that is indicative of the conditions external to the vehicle,
wherein the data that is indicative of the conditions external to the vehicle includes a proximity of other vehicles, weather conditions, or traffic conditions,
wherein the route attribute data includes a road grade of the predetermined route, a speed limit of the predetermined route, a road curvature of the predetermined route, or expected stops along the predetermined route, and
where the route attribute data and the data that is indicative of the conditions external to the vehicle includes (i) sensor data of the conditions external to the vehicle, (ii) data stored within the controller, or (iii) data received wirelessly from external sources.

* * * * *